(12) United States Patent
Prucher

(10) Patent No.: US 6,948,578 B2
(45) Date of Patent: Sep. 27, 2005

(54) MOTOR IN WHEEL ELECTRIC DRIVE SYSTEM

(76) Inventor: Bryan P. Prucher, 52 N. Main St., Clarkston, MI (US) 48346

( * ) Notice: Subject to any disclaimer, the term of this patent is extended or adjusted under 35 U.S.C. 154(b) by 0 days.

(21) Appl. No.: 10/846,068

(22) Filed: May 14, 2004

(65) Prior Publication Data

US 2004/0211606 A1 Oct. 28, 2004

Related U.S. Application Data

(62) Division of application No. 10/154,254, filed on May 23, 2002, now Pat. No. 6,851,496.
(60) Provisional application No. 60/293,893, filed on May 24, 2001.

(51) Int. Cl.[7] .................................................. B60K 1/00
(52) U.S. Cl. ........................................ 180/65.5; 180/65.1
(58) Field of Search ................................. 180/165, 167, 180/301, 234, 244, 65.1, 65.3, 65.5, 65.8; 318/245, 254, 810, 812, 565

(56) References Cited

U.S. PATENT DOCUMENTS 5,465,806 A * 11/1995 Higasa et al. ............... 180/165
5,572,106 A * 11/1996 Yamanashi et al. ......... 318/245
5,697,466 A * 12/1997 Moroto et al. ............. 180/65.8
5,806,617 A *  9/1998 Yamaguchi ................ 180/65.3
5,823,281 A * 10/1998 Yamaguchi et al. ....... 180/65.2
6,047,104 A *  4/2000 Cheng ........................ 318/245
6,222,331 B1 *  4/2001 Blum ......................... 318/254
6,262,550 B1 *  7/2001 Kliman et al. .............. 318/565

\* cited by examiner

Primary Examiner—Hau Phan
(74) Attorney, Agent, or Firm—The Weintraub Group, PLC (57) ABSTRACT

A vehicle is powered by an electric linear induction motor (LIM) in at least one of the vehicle wheels and the height from the ground and/or wheelbase changed by the wheel structure and its connection to the vehicle chassis. The LIM is disposed radially outwardly from the wheel axis of rotation and comprises a stator having an electrically energizable propulsion coil circumposed by a rotor. A stator shaft connects the stator to the vehicle chassis and the stator and associated shaft are fixedly-connected and angularly orbited about the inner diameter of the rotor whereby to change the height of the vehicle chassis from the ground or the wheelbase of the vehicle. The rotor is supported for rotation about the stator by bearings, or by magnetic levitation, as provided by a ring of permanent magnets in the rotor disposed in juxtaposition with an electrically energizable levitation coil in the stator.

4 Claims, 6 Drawing Sheets

HEIGHT CONTROL
LOW GROUND CLEARANCE
(LOW CENTER OF GRAVITY)

FIG 10

HEIGHT CONTROL
HIGH GROUND CLEARANCE
(HIGH CENTER OF GRAVITY)

FIG 11

TILT

FIG 12

TILT
(TRAILERING)

TILT
(HIGH-SPEED RAIL)

FIG 13

TILT WITH CG SHIFT
(TIGHT TURN)

HILL-SIDE

FIG 17

HILL-SIDE
(AGRICULTURAL)

HUB GUIDED WHEEL
HIGH TILT ANGLE
LOW CENTER OF GRAVITY

FIG 15

BOMBARDIER
SYSTEM
LIMITED TILT ANGLE

MOTOR IN WHEEL ELECTRIC DRIVE SYSTEM

CROSS-REFERENCE TO RELATED APPLICATIONS

This application is a divisional Patent Application of patent application Ser. No. 10/154,254, filed May 23, 2002, which issued Feb. 8, 2005 as U.S. Pat. No. 6,851,496, and is a completion application of U.S. Provisional Patent Application Ser. No. 60/293,893, filed May 24, 2001, the disclosures of which are hereby incorporated by reference.

BACKGROUND OF THE INVENTION

1. Field of the Invention

This invention relates generally to improvements in wheeled vehicles of the type having an electric powered, motor in-wheel drive systems, and preferably applicable to hybrid power systems, for propelling the vehicle. In particular, the wheeled vehicle according to this invention includes a combined brushless DC linear induction motor (LIM) vehicle propulsion or other motor-driven propulsion system and a wheel-axle structure, which enables the wheelbase and tilt of the vehicle chassis to be dynamically changed during propulsion of the vehicle.

2. Related Art

Electric vehicles and drive systems for vehicles are known. Electrically powered vehicles ("EV's") are similar to vehicles powered by an internal combustion engine and typically include a chassis for supporting the power system (i.e., the fuel cell, battery, etc.), a drive train and a suspension system, the suspension system connecting several axle and wheel assemblies to the drive train, and an arrangement for operatively connecting the battery in driving relation to the wheels. The EV is attractive in that the power unit therefor, in the form of a rechargeable battery pack, is environmentally clean (e.g., does not pollute the air during its operation) and its operation is very silent. However, the EV has met with market resistance in that the battery pack therefor is heavy—cutting down on the ability of the vehicle to accelerate rapidly, is large in size—restricting the amount of available space for transporting passengers or goods, and must be recharged frequently—cutting down on the length of the trip and/or limiting its use to short trips and/or restricting its use to large cities where recharging stations are available.

Electric drive systems are known, as illustrated by the circular induction motor wherein the rotational motion of a magnetic field with respect to rotor conductors causes a voltage to be induced in each, proportional to the magnitude and the velocity of the field relative to the conductors.

A particular variation of the traditional induction motor is the linear induction motor (LIM), essentially the circular induction motor opened out flat. The magnetic field, instead of rotating, sweeps across the flat motor face. The stator, usually known as the LIM, consists of a 3-phase winding in a laminated iron core. When energized from an AC supply a traveling wave magnetic field is produced. Swapping two phases can reverse travel. Current produced in the reaction plate (the equivalent of the rotor) by the stator traveling field create a secondary field. Desirably, the LIM can be used where unusual rotary drives are at a disadvantage, thereby eliminating mechanical transmissions, increasing reliability, where space is at a premium. Desirably, the LIM makes an ideal variable speed drive. It behaves like a magnetic clutch and gives soft start action.

A particular application of the LIM is in magnetic levitation whereby an apparatus rides on a cushion of opposing electromagnetic fields instead of on a hub or rail of steel to enable the apparatus to travel faster and more efficiently is known. For example, the magnetic levitation of a train is discussed by Scott Gourley in "Track to the Future", believed published in Popular Mechanics (May 1998) and by Dr. Richard F. Post in "Maglev: A New Approach", believed published in Scientific American (January 2000). Desirably, such apparatus provides "frictionless" systems that reduces energy requirements as well as wear on mating parts, thus minimizing down time to facilitate repairs.

Prior published U.S. Pat. Nos. 5,722,326; 5,847,480; and 5,455,221 to Post each disclose magnetic levitation arrangements, the disclosures of which are hereby incorporated by reference.

Further, in its current form, the motor vehicle incorporates numerous mechanical connections that are wasteful of energy and expensive to maintain and/or repair. Desirably, an improved motor vehicle would eliminate as much structure (e.g., the vehicle suspension, struts, drive train and its interconnection with the suspension and vehicle wheels) as possible without the loss of their specific functions.

In one particular aspect, the four-wheel system of a traditional vehicle would desirably be such that the user, or electronics of the vehicle control, could selectively change one or both of the vertical height of the vehicle chassis from the ground, or the wheelbase (i.e., point of contact with the ground distance) between the front and rear wheels of the chassis. Such adjustability would enhance the ability of the vehicle to truly be "all-terrain vehicle".

Electronics and an on-board computer system would be used to continuously monitor and adjust the position of the vehicle wheels, both vertically and horizontally relative to the longitudinal axis of the vehicle. The computer system would receive a first signal from one vehicle wheel as it moves along the ground, compare the signal with a predetermined value, and transmit a second signal to that wheel to adjust the position of the wheel relative to the other three vehicle wheels. This "signal comparing" could be conducted simultaneously and continuously on all of the four vehicle wheels to thereby enable the vehicle to be dynamically tuned to the road upon which it is moving, such as by maintaining the vehicle chassis (or platform) in a horizontal plane.

It would be desirable to provide an electric drive system to propel a vehicle, such as an automobile, that incorporates the positive advantages of the LIM and Maglev systems without the disadvantages associated therewith.

SUMMARY OF THE INVENTION

It is an object of this invention to provide an orbital wheel system that provides the means to dynamically control vehicle height, tilt, pitch and wheelbase with or without propulsion capability. In a specific embodiment, the present invention provides an electric drive system for a motor vehicle, which drive system is drivingly connected to the inner rim of at least one, and if desired, the inner rim of each of the respective vehicle wheels and which eliminates conventional chassis mounted power systems, drive trains and hub-mounted wheel-axle suspension systems.

According to this object of the invention, there is provided an electric drive system for a vehicle, the system comprising:

a rotor which forms, at least in part, a rotatable wheel structure of the vehicle, said rotor including an inner surface that is coaxial with the axis of rotation of the wheel structure, a stator which forms, at least in part, a stationary axle structure of the vehicle and includes an outer surface encircled by the rotor and an electrical coil connectible to a source of electrical power to generate an electromagnetic force to rotate the rotor relative to the stator, and means for coupling the stator to the wheel structure such that the stator is at a location radially outwardly from the axis of rotation of the vehicle wheel.

More particularly, there is provided according to this invention a motor vehicle, comprising:

a chassis having a forward and a rearward end spaced longitudinally and at least two wheels connected to the chassis for rotation relative thereto;

a motor connected to at least one of the two wheels to create an electromagnetic turning force to rotate the one wheel whereby to propel the chassis, the motor including:

a stator having an electrical coil connectible to an electrical power source and a cylindrical rotor having an inside surface encircling the stator and disposed for rotation about an axis of rotation, and means for connecting the stator to the rotor for relative angular orbiting rotation and positioning of the stator relative to the inside surface of the rotor; and means for mounting the stator to the chassis such that the stator is spaced radially from the axis of rotation and juxtaposed against the inside surface of the rotor, the means for mounting including an axial shaft having opposite end portions connected, respectively, to the chassis and said stator and an axis that is generally coaxial with and radially spaced from the axis of rotation, said coil, when connected to an electrical power source, creating an electromagnetic field between the stator and rotor sufficient to initiate rotation of the rotor about the stator and propulsion of the chassis.

Another object of this invention is to provide wheeled vehicles with the capability of adjusting the height of the vehicle chassis from the ground and/or changing the tilt of the chassis relative to the ground, so as to control the center of gravity, the tilt of the vehicle for hillside maneuvers, and/or change the wheelbase to enhance ride (extended wheelbase), tighten steering radius (shortened wheelbase), and redistribute load.

According to this object of the invention, the aforesaid motor vehicle further comprises said mounting means including said stator and associated shaft being angularly movable relative to the inside diameter of the rim and mounted for orbiting movement and positioning within the inside diameter of the rotor.

Further and according to this object there is provided a vehicle including a chassis having an axle structure at the front and rear ends and respective lateral sides of the chassis, an axial shaft projecting from each axle structure, a wheel structure connected to each respective shaft for supporting the chassis on the ground for movement therealong, electrical power means, in each wheel, for driving each wheel structure independently of the other wheel structures, and means for independently selectively changing the position of one or more of the respective wheel structures relative to the other wheel structures.

According to this aspect of the invention, the means for selectively changing is adapted to change the vertical distance of the chassis from the ground, or the longitudinal distance between the wheel structures at the forward and rearward ends of the chassis. The means for independently selectively changing comprises:

each said wheel structure comprising a cylindrical hub member having an outer surface and a rim member having an inner surface, the inner surface of the rim member encircling the hub member and connected thereto for rotation thereabout, the inner and outer respective surfaces of the hub and rim members being coaxially disposed about a central axis of rotation, the shaft associated with each respective wheel structure and axle structure having an inboard end portion connected to the axle structure and an outboard end portion connected to the hub member proximate to the inner surface of the rim member such that the hub member is spaced radially from the axis of rotation; and means for changing the angular position of the hub member relative to the inner surface of the rim member, the means for changing being associated with each wheel structure and operating to orbit the shaft and associated stator in a rigid body movement relative to the inner surface of the rim member, whereby depending respectively on the number of shafts and associated stators that are rotated relative to the respective rotors and the manner by each respective shaft and associated stator is repositioned relative to the chassis, the height of the chassis from the ground and/or the wheelbase of the vehicle as measured by the distance between the points of contact of the wheels to the ground associated with the forward and rearward wheel structures can be lengthened and/or shortened.

According to this latter aspect of the invention, the shaft associated with the stator assembly of each wheel structure is connected to a trunnion. The trunnions of the stator assemblies are operable independently of one another to move the respective stator assembly vertically upwardly or downwardly, with movement of such wheel structures (such as along one side of the chassis) operating to elevate/lower that side of the chassis relative to the other side of the chassis. That is, the chassis is tilted relative to the ground.

Further and according to a further aspect of the invention, a mechanical arrangement which enables angular repositioning of the wheel stator relative to the hub includes a ring gear assembly which is driven by a powered shaft, one terminus or end of which meshingly engages the ring gear for repositioning the drive shaft. The drive shaft has a first end portion connected to the motor or other power source or driving means and operatively engaging the toothed wheel or ring gear. The teeth of the wheel are operably engaged with the toothed annular surface with driving rotation of the drive shaft angularly positioning the shaft about the rotor.

In addition to providing the aforementioned vehicle with means for changing the angular position of one or more of the shafts relative to its respective wheel structure, at least one wheel structure includes powering means for powering the wheel thereof whereby to propel the vehicle chassis. According to this aspect, the powering means comprises:

a generally flat reaction plate of electrically conductive material projecting radially inwardly from the inner surface of the rim member, the rim member comprising the rotor of an electrical induction motor and the reaction plate extending 360° in encircling relation about the hub member, a helical electrical winding in the form of an annular coil mounted to the hub member in juxtaposition with the reaction plate, the hub member comprising the stator of the induction motor, and means for supplying electrical current to said electrical winding to create an electro-magnetic force to urge the rim to rotate relative to the hub.

Desirably, providing each wheel structure with both a linear induction motor and a trunnion mounting arrangement that positions the stator of the motor relative to the rotor enables a vehicle to have four wheel drive, three wheel drive, two wheel drive, one wheel drive or no wheel drive (no motors), only front or only rear wheel drive, tilt control over the chassis to provide real time dynamic control over the vehicle mass center to obviate roll-overs during cornering.

Desirably, the motor in wheel electric drive system of the present invention significantly reduces the power train complexity of presently manufactured internal combustion driven vehicles by combining the functional attributes of and eliminating the need for the gas powered engine as a propulsion device, the complex transmission, the drive shaft, and the rear axle assembly and related components, i.e., ring gears, pinions, and the like.

The vehicle drive system is upgradeable. That is, the system can be applied to any electric power source as the power technology develops from hybrid electric to fuel cells.

The motor in wheel concept is readily applicable to the tilt technology being used in new high-speed train systems developed for AMTRAK and others. Using this system in high-speed mass transit applications would provide superior performance as it would provide higher tilt angles and lower center of gravity than a "Bombardier" system presently being used.

Desirably, the ability to relocate the point at which the mass is attached to a wheel would stabilize the system in that the sum of the acceleration forces could be made to act through the point of contact of the wheel to the ground.

The hillside-leveling feature will provide tractor and harvesting equipment the capability to adapt to any terrain.

As combined, the motor drive and tilt arrangement would enable four wheel drive, four wheel steer, variable height, steer by wire, hybrid rolling chassis with independent suspension, tilt control and load redistribution capability.

Desirably, the present invention provides a variable height, variable tilt, variable wheelbase, four wheel drive, four wheel steer, fully electronically integrated hybrid rolling chassis with active suspension, enhanced acceleration, regenerative braking, and a steering arduous of almost zero.

Additional objects, features and advantages of the present invention will be readily appreciated as the same becomes better understood after reading the subsequent description taken in conjunction with the accompanying drawings.

DESCRIPTION OF THE PREFERRED EMBODIMENT(S)

At the outset, it should be noted that the ensuing description is made with reference to an electrically powered system and, thus, throughout the specification and claims, the term "stator" and "rotor" are used. However, since the present invention contemplates a mechanical system as being within the ambit hereof, it is to be understood that the "stator" includes a mechanical equivalent of a "hub" in both the specification and claims.

Figure 1:
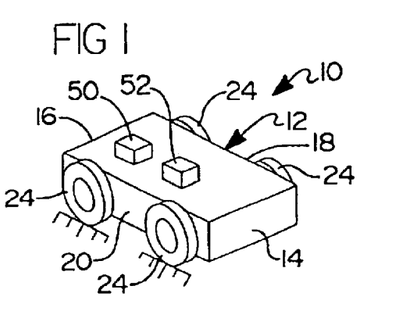
FIG. 1 is a perspective view of a wheeled vehicle according to this invention that includes a preferred embodiment of a wheel structure.

Referring now to the drawings, there is shown in FIG. 1 a motor vehicle 10 of the type including a chassis 12 having a forward and a rearward end 14 and 16 spaced longitudinally and a pair of lateral sides 18 and 20, an axle structure 22 fixedly disposed at the forward and rearward end of each lateral side, and a separate wheel structure 24 connected to each respective axle structure. The vehicle chassis 12 is suitably configured to mount an electrical power source 50 in the form of a conventional DC battery, and a vehicle management controller 52. The management controller 52 is in communication with an on board computer and is adapted to receive, compare and send signals substantially simultaneously to a motor in wheel, as described herein below, representative of parameters reflecting the operation of the vehicle, and direct the battery to supply electrical energy to one or more of the wheel structures as needed.

The wheel structures 24 and axle structures 22 are the same and the description hereinbelow applies to each of the wheel structures and associated axle structures.

Figure 2:
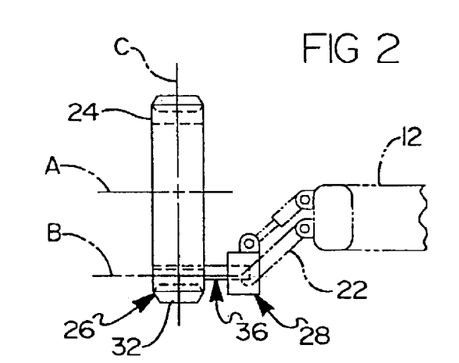
FIGS. 2 and 3 illustrate front and side elevation views of a first preferred embodiment of the wheel structure and its connection to the vehicle and a motor in wheel drive arrangement according to this invention.
Figure 3:
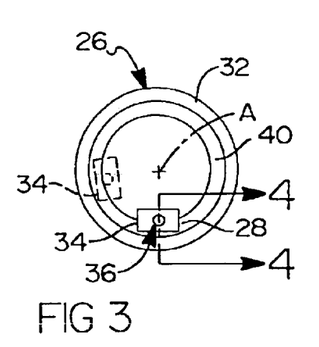
Figure 4:
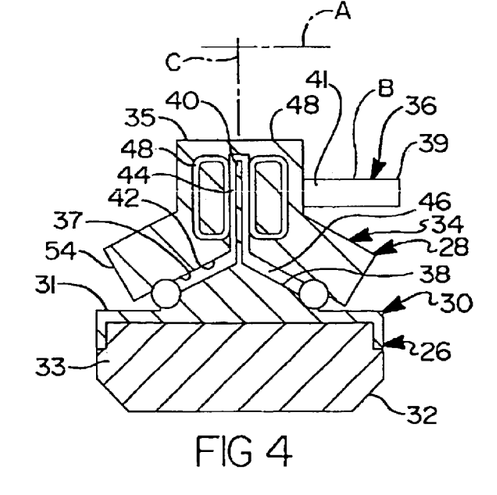
FIG. 4 is an enlarged view, partially in section and taken along line 4—4 of FIG. 3, of the motor in wheel drive arrangement according to this invention.

Referring to FIGS. 2–4, the wheel structure 24 includes a wheel and rim assembly 26, and a hub and fixed shaft assembly 28. The wheel and rim assembly 26 includes a wheel rim 30 which forms a rotor, as will be described hereinbelow, and a conventional tire 32. The wheel rim or rotor 30 is ring-shaped and has inner and outer surfaces 31 and 33 disposed on respective diameters coaxially centered about the axis of rotation "A" of the wheel with the tire 32 being mounted to the outer surface 33.

The hub and fixed shaft assembly 28 includes a housing or hub member 34 and an axial shaft 36, which forms, at least in part, a stator, as will be described hereinbelow. The hub member 34 is Y-shaped in cross-section and has opposite end faces, inner and outer radial surfaces 35 and 37 disposed on respective diameters centered coaxially about the axis of rotation "A", and inner and outer axial faces. The outer surface 37 of the stator 34 is encircled by and in juxtaposition with the inner surface 31 of the rotor 30.

The axial shaft 36 is axially extending and has an inboard end portion 39 fixedly secured to the axle structure of the wheel and an outboard end portion 41 fixedly secured to the hub member 34. The shaft 36 is disposed along a longitudinal axis "B" which is generally coaxial and parallel to, but spaced radially from, the axis of rotation "A". The shaft 36 spaces the hub member or stator 34 radially from the axis of rotation of the wheel rim and, in part, connects the stator 34 to the chassis.

Preferably and according to this embodiment of the invention, the shaft 36 is generally perpendicular to the axial surface of the hub member or stator 34. These axial surfaces extend radially between the inner and outer surfaces 35 and 37 of the stator 34 and are generally transverse to a vertical plane "C" passing through the rotor 30 and the stator 34.

Preferably and according to this invention, the inner surface 31 of the rotor 30 is defined by a convex V-shaped surface 38 and the outer surface 37 of the stator 34 is defined by a concave V-shaped surface 42. The V-shaped surfaces 38 and 42 are complementary to one another to enable one to interfit within the other and define a V-shaped annulus 46 that separates the rotor from the stator.

A generally flat, substantially continuous planar reaction plate 40 of magnetizable material extends radially inwardly from the inner surface 38 towards the axis of rotation. The plate extends substantially 360° about the inner surface 38, medially of the inner surface, and from the V-shaped peak thereof. The inward radial extension of the plate 40 defines an annular surface 43 that is coaxial to the inner surface 38 and the axis of rotation.

Further, the stator housing 34 includes an annular slot 44 that extends between the end walls and inwardly from outer surface 37. In particular, the slot is disposed medially of the axial faces and medially of the V-shaped surface 42. The slot 44 is dimensioned to receive the plate 40 for rotating fitment therewithin. Generally, the reaction plate 40 and the annular slot 44 are in the plane "C" that is perpendicular to the axis of rotation.

Electrical propulsion to the wheel structure 24 is achieved by centering motor, such as a linear induction motor (LIM), a DC motor, LDCM, conventional AC/DC motor, homopolar motor, etc., at the point where the inboard end portion 41 of the shaft 36 attaches to the stator 34. Preferably, the motor is a LIM. In this regard an annular electrical coil or conductive winding 48 is disposed on each side of the magnetizable reaction plate 40, the electrical coil being energizable by the external or auxiliary electrical power source 50 whereby to create a magnetic force to start the wheel rotor rotating relative to the stator and propelling the vehicle.

In this regard, the coil is formed by an electrical wire that is wound about an imaginary circle centered on the axis of rotation to form the annular coil winding 48, the winding being disposed in a plane generally perpendicular to the axis of rotation. The quantity, size and configuration of the LIM coils 48 will be determined by the power and torque requirements.

Electrical conductors from outside the wheel assembly are used to receive and supply electrical current. For example, the shaft may be hollow for passing the conductors between the stator and the chassis.

The wheel rim 30 can be configured so that it serves as the rotor for both the electric motor as well as a disc brake. The service requirements for a friction brake will be minimal, as the majority of the braking will be either regenerative or rheostatic. Mechanical braking can be limited to slower speeds or holding the vehicle once it has stopped.

The hub and shaft assembly 28 is shown as comprising a trunnion housing or mount 28a, and a pair of axially retractable pistons 28b and 28c. The pistons 28 have first and second ends, respectively, connected to the shaft 36 and the chassis 12. Movement of the axle structure 22 can selectively reposition the stator 34 (and associated axial shaft 36), and thus the height of the chassis from the ground.

Additionally, associated with each wheel structure, a second trunnion mount or housing may be employed to angularly reposition a respective stator relative to the inside surface of the rotor.

Figure 5:
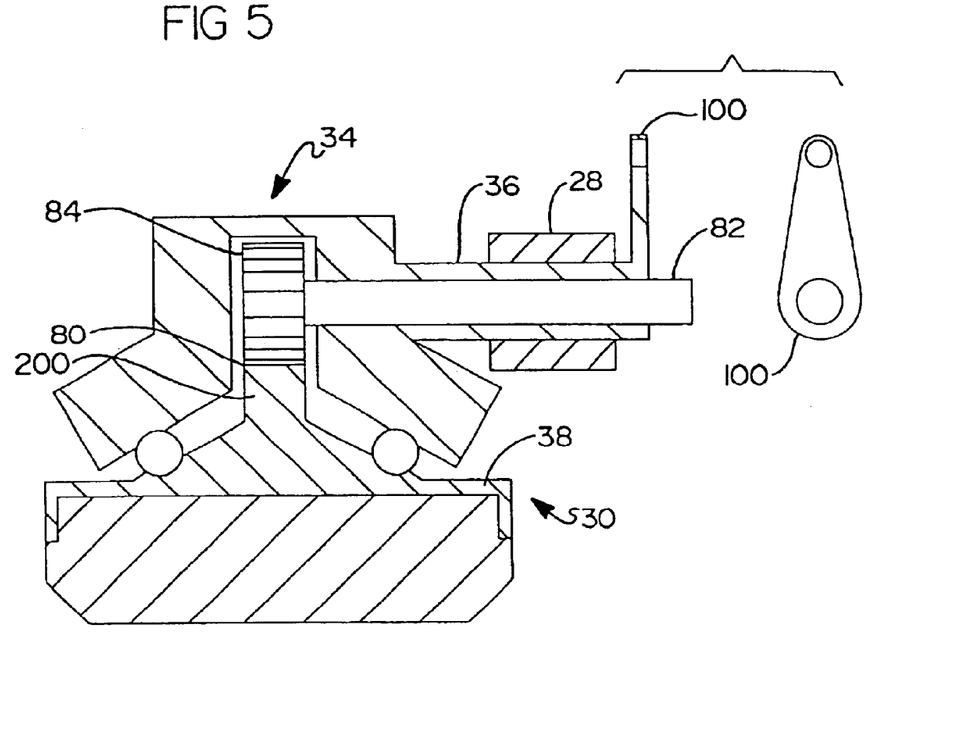
FIG. 5 is a section view of a trunnion mounting arrangement for angularly repositioning a shaft relative to a wheel in a system for mechanically driving the wheel.
Figure 22:
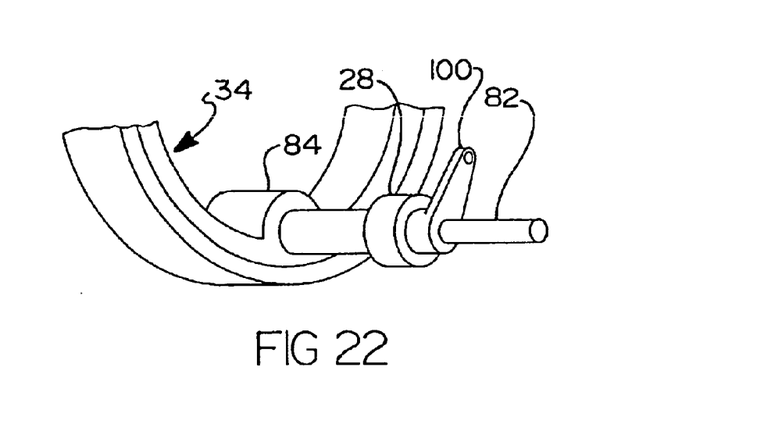
FIG. 22 is a perspective view of the drive shaft-trunnion assembly of FIG. 5.

In FIGS. 5 and 22 there is depicted a "mechanically" driven system where the equivalent of rotor 30 comprises a non-electric internally toothed ring gear 2000 which is attached to the inner surface 38 of the rim 30 that is driven around the hub 34 by the toothed wheel 84, to which it is operatively connected.

The hub 34 includes the annular slot 44, and the rotatable member 30 includes the ring gear 200 extending radially inwardly from the inner surface 38. According to this aspect of the invention, the gear 200 terminates in an annular surface 80 that is provided with a continuous array of engageable teeth, the inner surface 38 and annular surface 80 being coaxial with one another and the axis of rotation. The trunnion mount 28 includes a drive shaft 82 that is coaxial to the axial shaft 36, the drive shaft 82 extending between a first end 82a that is proximate to the chassis and a second end 82b. Connected to the second end for driving rotation by the drive shaft 82 is a toothed wheel 84. The toothed wheel 84 is disposed in the slot 44 and engaged with the teeth on the toothed annular surface 80. Rotation of the drive shaft causes the rim 30 to rotate around the hub 34 to orbit.

In a preferred embodiment, a Pitman arm 100 is attached to the shaft 36 for angularly rotating the hub/wheel assembly around the axis "A" and orbitally repositioning the shaft 36 and, necessarily, the trunnions 28 and the chassis to which it is affixed or otherwise integral with.

To obviate "dragging" between the rotor 30 and the stator 34, a "roller support" is provided for spacing and supporting the rotor for rotation relative to the stator 34.

As shown in FIG. 4, at least one roller or ball bearing 54 is journalled for rotation in between the V-shaped faces 38 and 42 of the rotor and stator to ensure that the annular gap 46 is maintained and the rotor will rotate relative to the stator. If desired, rather than being disposed in the annular gap 46, the roller bearings 54 may be mounted in the outer circumference 31 of the rotor 30 and positioned for engaging and supporting angled exterior walls of the stator housing 34.

Figure 6:
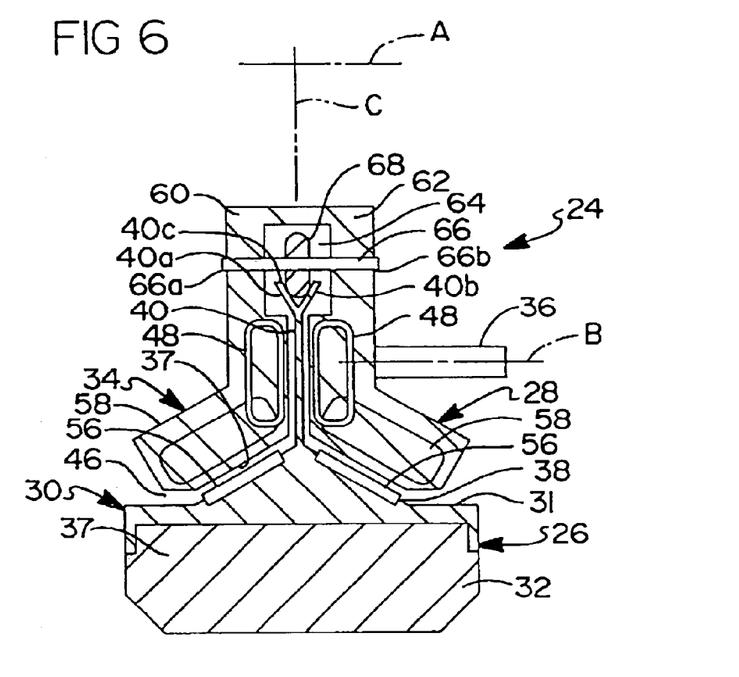
FIG. 6 is an enlarged section view, similar to that shown in FIG. 4, of a second preferred embodiment of a motor in wheel system that has been modified to include magnetic levitation and a stator support arrangement according to this invention.

In a second embodiment of an electrical motor in wheel arrangement according to this invention, as shown in FIG. 6, the rotor 30 includes a continuous string of permanent magnets 56 and the stator 34 includes a group of pairs of closely packed electrically energizable closed circuit electrical coils or windings 58. The magnets 56 are disposed in each angled face of the V-shaped surface 38 of the rotor 30 and circumferentially arranged in a Hallbach array so that the magnetic orientation of each magnet is at right angles to the magnet adjacent thereto. As the permanent magnet array passes over the coil pairs 58 an electric current is developed in the coils that in turn generates an opposing electromagnetic field that repels the magnet array thus creating a levitating force that supports the rotor 30 in spaced relation from the stator 34.

Alternatively, it is to be understood that the array of permanent magnets could be mounted in the stator and the electrical coils disposed in the rotor, or that the V-shaped surfaces could be projecting radially outwardly, or that the positions of the reaction plate and annular slot therefor could be reversed wherein the reaction plate extends radially outwardly from the stator for receipt in an annular slot provided in the rotor.

Preferably and according to the motor in wheel embodiment shown in FIG. 6, a "roller support" is utilized to space and support the rotor 30 from the stator 34 until the relative speed between the magnet array and the coils reaches the threshold where an electromagnetic field of sufficient strength to repel is developed and magnetic levitation will occur. In particular, the reaction plate 40 of the rotor 30 is configured to terminate in a pair of outwardly extending arm members 40a and 40b, the arm members 40a and 40b forming a cradle or Y-shaped support section 40c. It will be appreciated that the arms could also desirably cooperate to form either a U-shaped or a V-shaped cradle for supporting the roller wheel.

The stator 34 includes a pair of laterally spaced wall portions 60 and 62 that cooperate to form an enlarged chamber 64 in the stator housing, an axially elongated support rod 66, and a roller wheel 68. The annular slot 44 extends radially inwardly from the outer circumference 37 of the stator housing and into the chamber 64 with the slot 44 and chamber 64 being sized to receive, respectively, a medial portion of the reaction plate 40 and the support section 40c formed at the end of the reaction plate. The support rod 66 has opposite end portions 66a and 66b supported in the respective wall portions 60 and 62 and a medial portion disposed in the chamber. The roller wheel 68 is rotatably disposed on the support rod 66 and rollably seated within the cradle formed by the arms 40a and 40b of the Y-shaped support section 40c.

Figure 7:
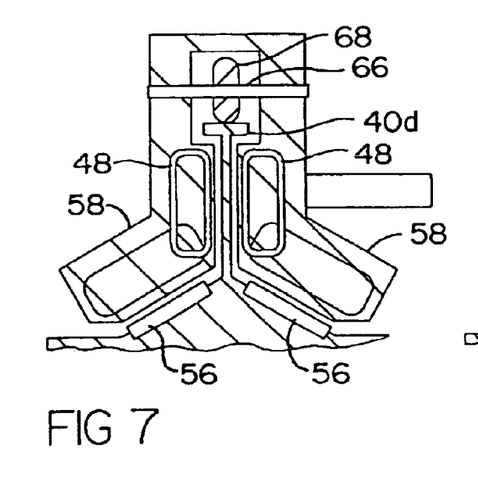
FIGS. 7 and 8 are similar to the motor in wheel system of FIG. 6 and illustrate alternate embodiments of stator support arrangements.
Figure 8:
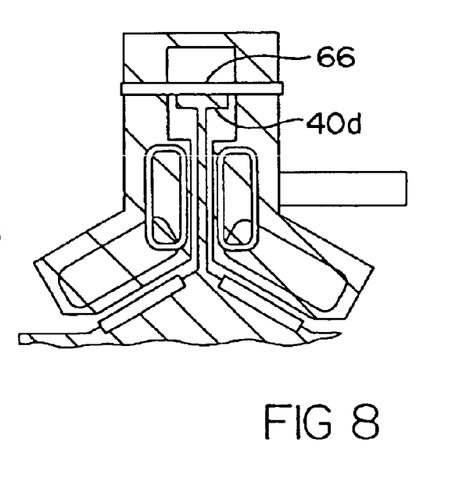

FIGS. 7 and 8 are similar to FIG. 6 and illustrate alternative arrangements for supporting the stator relative to the rotor. In FIG. 7, the reaction plate 40 terminates in a support plate 40d whereby to form a T-shaped support section. The radially inwardly disposed (top) surface of the T-shaped section supports the roller wheel 68 thereon. In FIG. 8, the reaction plate 40 terminates in the support plate 40d upon which the support rod 66 is supported.

Preferably and according to this invention, the motor in wheel arrangement can be utilized to provide for tilt control and change of wheelbase, whether dynamically or passively. As shown in FIGS. 2 and 5, the stator or hub 34, depending on whether the system is electrical or mechanical, is mounted to the vehicle chassis 12 and the outboard end 41 of the shaft 36 is fixedly connected to the stator or hub housing. The inboard end 39 of the shaft 36 is rotated about its axis "B" with respect to the fixed trunnions 28, causing the hub or stator and associated shaft to "orbit" as a rigid body around axis "A" relative to the inside diameter of the rotor or rim 30 to a new angular position 34' elevating the chassis 12 along with it.

This orbiting action can be initiated by any mechanism (electric motor, Pitman arm, etc.) that produces a force that causes the shaft 36 to rotate with respect to the trunnions 28 around its axis "B".

As shown best by referring to FIG. 3, the stator 34 is initially positioned at 6:00 o'clock relative to the rotor. Thereafter, the shaft and associated stator are rotated relative to the inner circumference of the rotor and positioned at 9:00 o'clock relative to the rotor, as shown at 34'. In this example, the shaft 36 is repositioned and results in the chassis being lifted relative to the respective wheel structure and the axis of rotation moved to the right (as seen in FIG. 3). One or more of the shafts 36 (and associated stator housings 34) can be angularly repositioned by rotation in a like manner relative to their respective rotors, thereby changing the vertical height of the chassis from the ground at that wheel, the angular orientation (i.e., tilt) of the chassis 12, and the distance between the wheel structures at the opposite ends of the chassis to change the wheel base. As noted, the shaft 36 rotates about its' axis "B" and "orbits" about the axis of rotation "A", causing the stator 34 that is fixedly connected thereto to orbit relative to the inner diameter (circumferential surface) 31 of the rotor and thus reposition the angular location of the stator 34 relative to the rotor 30.

Figure 9:
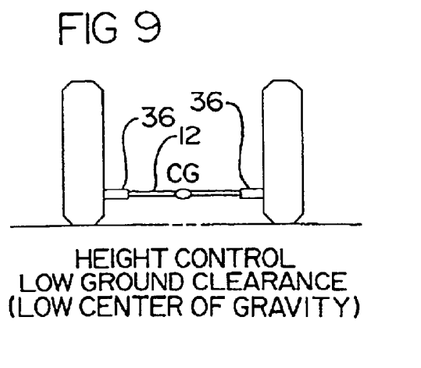
FIGS. 9 and 10 are elevation views illustrating various height control arrangements according to this invention.
Figure 10:
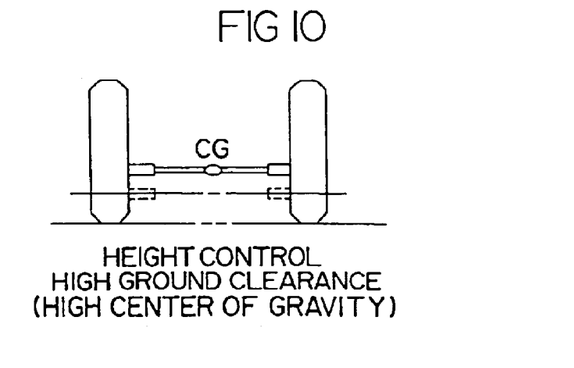

FIGS. 9–10 are illustrative of arrangements providing height control. In each Figure, two axial shafts 36 are axially aligned with one another and are conceptually shown as being connected to the chassis 12 and the center of gravity CG (i.e., the total mass of the chassis and whatever load it may be supporting) is concentrated at the midpoint of the chassis. In FIG. 9, the CG is positioned low to the ground to provide a vehicle with a low center of gravity. The support shafts 36 and vehicle chassis or mass are at their lowest point (i.e., closest to the ground) and both of the shafts are at about 6:00 o'clock relative to the wheel (or rotor). In FIG. 10, the CG is positioned higher from the ground to provide a vehicle with a high center of gravity. The shafts 36 and vehicle mass is raised from the ground and relative to the rotor the shafts 36 are approximately at 9:00 o'clock (as seen looking from left to right) or at about 3:00 o'clock (as seen looking from right to left). While not shown, the maximum height of the vehicle CG or mass from the ground would be when both of the shafts are at 12:00 o'clock relative to the rotor.

FIGS. 11–17 are illustrative of embodiments for changing height and/or adjusting the tilt of the vehicle, such as for hillside maneuvers and/or positioning the vehicle chassis in a specific attitude. These arrangements are similar to FIGS. 9 and 10, in that the chassis and wheel structures can be changed dynamically depending on the road conditions, but differ in that the respective stator and associated shafts of different wheels "orbit" about the inner circumference of the respective rotors by different amounts.

Figure 11:
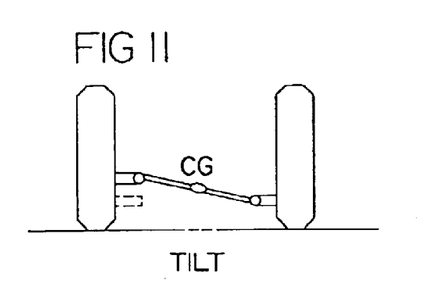
FIGS. 11–17 are elevation views illustrating various tilt control arrangements according to this invention.
Figure 12:
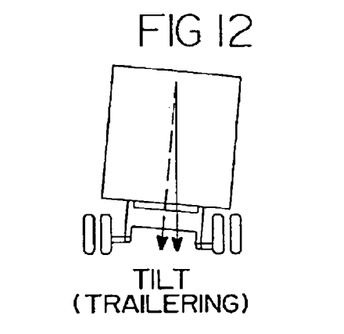
Figure 13:
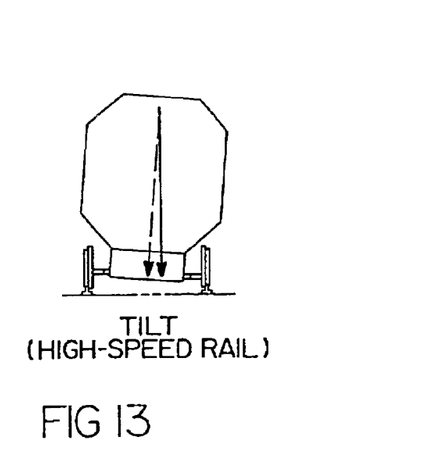

In FIG. 11, the shafts 36 are at 9:00 o'clock/3:00 o'clock and at 6:00 o'clock, respectively, resulting in the CG of the vehicle being raised slightly and the chassis 12 being oriented at an acute angle to the ground. FIGS. 12–13 illustrate trailered vehicles and high-speed rail cars being oriented as desired.

Figure 14:
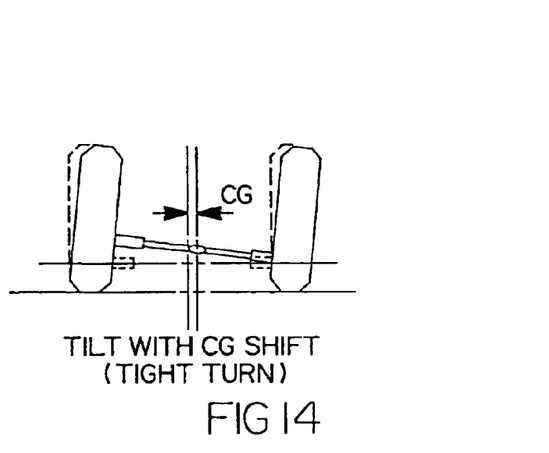

FIG. 14 illustrates tilt of the chassis 12 with shift in the chassis CG.

Figure 15:
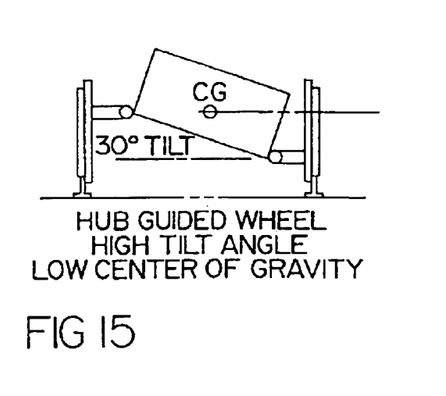
Figure 16:
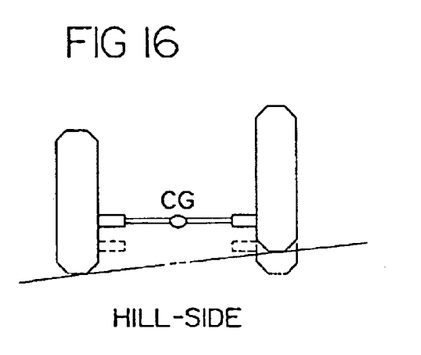
Figure 17:
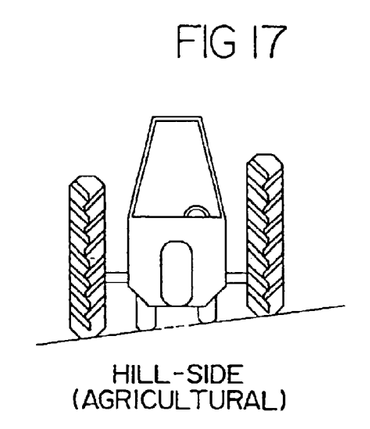

FIGS. 15–17 are particularly illustrative of arrangements for high speed track/rail arrangements, or hillside applications, such as where the cab of a tractor needs to be oriented upwardly.

Figure 18:
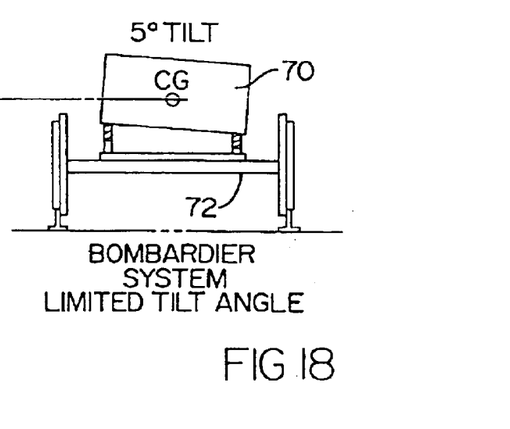
FIG. 18 illustrates a presently utilized "Bombardier" tilt control arrangement used with AMTRAK track systems.

FIG. 18 illustrates a currently proposed "Bombardier" system wherein a cargo container 70 is tilted by about 5° relative to the bed 72 upon which it rides.

Figure 19:
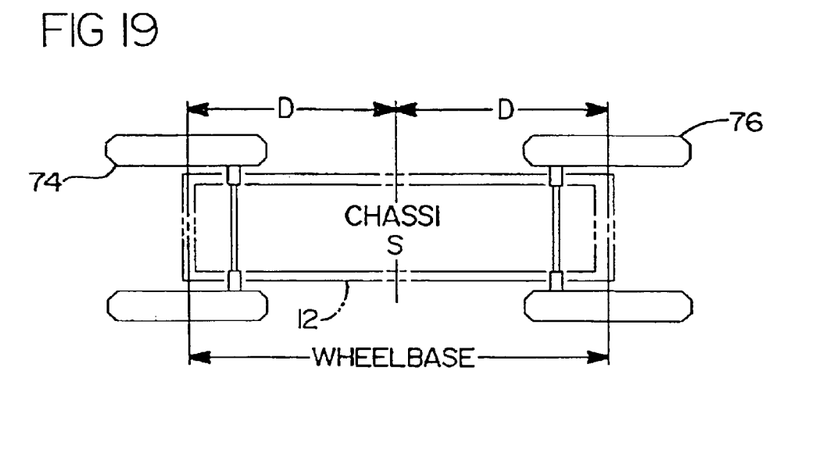
FIGS. 19–21 are plan views illustrating various arrangements for changing the wheelbase of the vehicle wheels.
Figure 20:
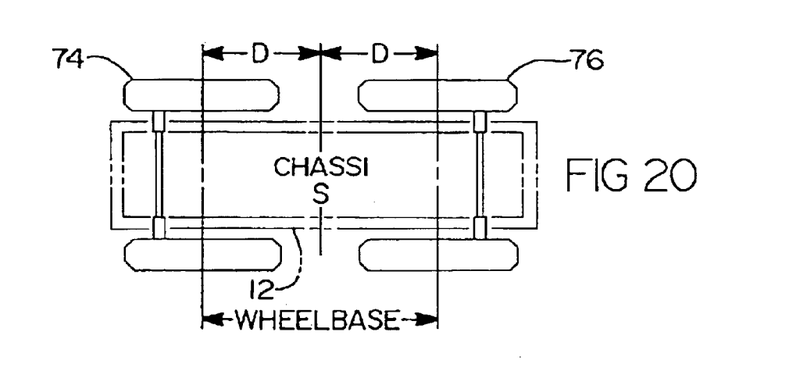
Figure 21:
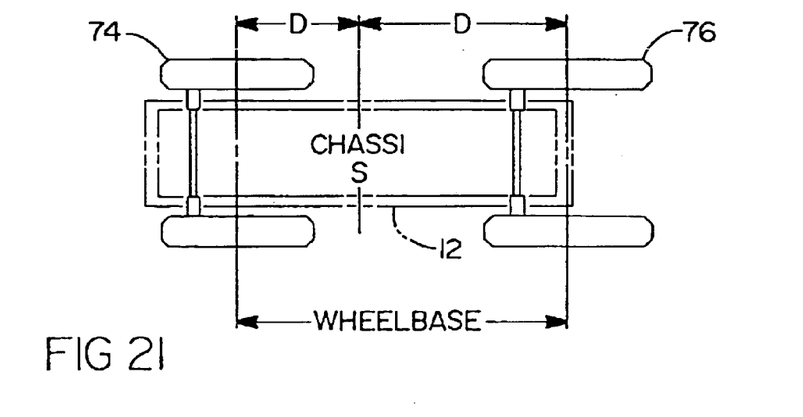

FIGS. 19–21 are plan views illustrating various arrangements whereby the distance or wheelbase "D" between the axes of rotation of the front and rear pairs of wheel structures 74 and 76 can be changed. As shown in FIG. 19, the distance between the axes of rotation of the rearward wheel pair 76 is furthest away from the axes of rotation of the forward wheel pair 74 (extended wheelbase) for a smoother ride. In FIG. 20, the distance between the axes of rotation of the wheel pair 76 is closest to the axes of rotation of the wheel pair 74 (shortened wheelbase) for a tighter steering radius. Finally, in FIG. 21, the axes of rotation of both wheel pairs 74 and 76 are moved in a like direction (shown moved to the right) for load redistribution.

Advantageously, a motor in hub guided wheel structure according to this invention enables greater control over tilt and placement of the center of gravity. Importantly, the wheel structure could be used to advantage either with the power drive alone, or with the tilt control alone, or most advantageously, in a vehicle wherein the wheel structure thereof incorporates both the motor in the wheel arrangement to drive the vehicle and the axle-wheel structure to control the tilt of the vehicle.

It is to be appreciated that the management controller can be used in dynamic situations to control the ride along bumpy surfaces. The electronics that controls the position of the vehicle wheels, both vertically and horizontally relative to the longitudinal axis of the vehicle, would desirably be fed into a computer system that would receive a first signal, such as from one wheel as it moves along the ground, compare the signal with a predetermined signal and transmit a second signal to that wheel to adjust the position of the wheel relative to the other three vehicle wheels. This "signal comparing" could be conducted simultaneously and continuously on all of the vehicle wheels thereby enabling the vehicle to be dynamically tuned to the road upon which it is moving, such as to maintain the vehicle platform in a horizontal plane for a level ride, or to "inhibit" adverse roll-over of a vehicle having a high center of gravity.

It should further be noted that each levitation embodiment hereof, as illustrated, has the magnets disposed within the wheel and the windings or coil disposed within the hub or stator. However, it is to be understood and is within the scope hereof that the arrangement be reversed. In other words, the magnets would be disposed in the hub and the coil would be mounted to and within the wheel.

Broadly speaking then, the invention herein contemplates a feedback control apparatus mounted to the chassis and electronically coupled to a movable wheel structure for receiving a first directional and identifiable electromagnetic signal, or sending a second directional and identifiable signal. The signals may relate to a change in velocity of one or more of the movable wheel structures and/or to rate of change in velocity of one or more of the wheel structures, and of a predetermined data size and signal strength.

The feedback control apparatus includes a processing unit, a detector for receiving the first signal, an emitter coupled to the processing unit for transmitting the second signal, an accelerometer (or velometer) coupled to the processing unit to indicate acceleration and/or velocity of the wheel structures, and means for processing the signals. This apparatus is not shown as being conventional and understood by one skilled in the art.

While preferred embodiments have been shown and described, it should be understood that changes and modifications can be made therein without departing from invention in its broader aspects. Various features are defined in the following claims.

It should be noted that although the present invention has been described herein with reference to a driving wheel, it is possible to render the present wheel assembly as a driven or trailing wheel since the tire is free wheeling by virtue of the annularly disposed bearings 54 located in the gap 35 or in the outer circumference 31. Herein, the shaft 36 is orbited to raise or lower the chassis and is locked against movement by either the configuration of the interengagement between the end of the shaft and chassis by a motor lock, Pitman arm or other level mechanism.

What is claimed is:

1. An electric motor in wheel drive system for a vehicle, the system comprising:

an annular rotor which forms, at least in part, a rotatable cylindrical wheel structure of the vehicle and which is rotatable about a central axis of rotation, said rotor including a cylindrical inner surface coaxial with the axis of rotation, a stator which forms, at least in part, a stationary axle structure of the vehicle and includes an electrical coil for receiving and transmitting electrical power, the stator being encircled by the inner surface, and means for coupling the stator to the rotor such that the stator is located radially outwardly from the central axis of rotation of the wheel structure and disposed for orbiting movement relative to the inner surface of the rotor to develop an electromagnetic turning force therebetween, initial rotation resulting from the stator receiving electrical power and continued electrical power being generated from relative rotation.

2. The motor in wheel electric drive system as claimed in claim 1, the drive system further comprising:

means for angularly positioning the axle structure and said stator relative to the inner surface of the rotor.

3. The motor in wheel electric drive system as claimed in claim 2, the drive system further comprising:

means associated with the vehicle for generating and transmitting a first signal representative of a parameter reflecting the operation of the vehicle; and vehicle management means in electrical communication with the coil of said stator and an on board computer for continuously receiving and comparing the first signal with a value representative of a desired operation of the vehicle and transmitting a corrective signal to said stator either to change the position of the stator relative to the vehicle wheel or to adjust the relative rotation between the stator and the rotor and thus change the speed of the vehicle.

4. An electric motor in wheel drive system for a vehicle, the system comprising:

a stator which forms, at least in part, a stationary axle structure of the vehicle and includes an axle disposed on a first axis and an electrical coil coaxially disposed about said axis for receiving and transmitting electrical power, an annular rotor which forms, at least in part, a rotatable cylindrical wheel structure of the vehicle and includes a cylindrical inner surface which is rotatable about a central axis of rotation, means for coupling the stator to the rotor such that the axes are in parallel spaced apart relation to one another and the stator is encircled by the rotor disposed for orbiting movement relative to the inner surface of the rotor to develop an electromagnetic turning force therebetween, initial rotation resulting from the stator receiving electrical power and continued electrical power being generated from relative rotation, means for angularly positioning the axle structure and said stator relative to the inner surface of the rotor, means associated with the vehicle for generating and transmitting a first signal representative of a parameter reflecting the operation of the vehicle; and vehicle management means in electrical communication with the coil of said stator and an on board computer for continuously receiving and comparing the first signal with a value representative of a desired operation of the vehicle and transmitting a corrective signal to said stator either to change the position of the stator relative to the vehicle wheel or to adjust the relative rotation between the stator and the rotor and thus change the speed of the vehicle.

* * * * *